(12) United States Patent
Price

(10) Patent No.: US 9,605,399 B2
(45) Date of Patent: Mar. 28, 2017

(54) SHEETING PANELS AND SHEETING-PANEL SYSTEMS

(71) Applicant: Ground Protection, LLC, Broomfield, CO (US)

(72) Inventor: Arthur L. Price, Charlotte, NC (US)

(73) Assignee: GROUND PROTECTION, LLC, Broomfield, CO (US)

( * ) Notice: Subject to any disclaimer, the term of this patent is extended or adjusted under 35 U.S.C. 154(b) by 0 days.

(21) Appl. No.: 14/839,584

(22) Filed: Aug. 28, 2015

(65) Prior Publication Data

US 2016/0060839 A1    Mar. 3, 2016

Related U.S. Application Data

(60) Provisional application No. 62/043,895, filed on Aug. 29, 2014.

(51) Int. Cl.

| | |
|---|---|
| *E02D 17/04* | (2006.01) |
| *E02D 17/08* | (2006.01) |
| *E02D 5/03* | (2006.01) |
| *B29C 70/70* | (2006.01) |
| *B29C 70/68* | (2006.01) |
| *B29L 31/00* | (2006.01) |
| *B29K 267/00* | (2006.01) |
| *B29K 309/08* | (2006.01) |

(52) U.S. Cl.
CPC .......... *E02D 17/086* (2013.01); *B29C 70/681* (2013.01); *B29C 70/688* (2013.01); *B29C 70/70* (2013.01); *E02D 17/04* (2013.01); *E02D 17/083* (2013.01); *B29K 2023/06* (2013.01); *B29K 2267/00* (2013.01); *B29K 2309/08* (2013.01); *B29L 2031/768* (2013.01); *E02D 5/03* (2013.01); *E02D 17/08* (2013.01)

(58) Field of Classification Search
CPC .. E02D 5/02; E02D 5/03; E02D 17/04; E02D 17/08
USPC ................................ 405/272, 274, 282, 283
See application file for complete search history.

(56) References Cited

U.S. PATENT DOCUMENTS

| | | | | |
|---|---|---|---|---|
| 1,732,288 | A * | 10/1929 | Stelzer | E02D 17/10 |
| | | | | 404/25 |
| 3,766,740 | A * | 10/1973 | Teegen | E02D 17/08 |
| | | | | 405/282 |
| 3,949,144 | A * | 4/1976 | Duff | E04C 2/26 |
| | | | | 428/413 |
| 4,259,028 | A * | 3/1981 | Cook | E02D 17/08 |
| | | | | 156/79 |
| 4,685,837 | A * | 8/1987 | Cicanese | E02D 17/08 |
| | | | | 405/272 |

(Continued)

FOREIGN PATENT DOCUMENTS

| | | | | |
|---|---|---|---|---|
| FR | WO 0127395 A1 * | 4/2001 | | E01C 9/086 |
| GB | 191316024 A * | 0/1914 | | E02D 5/04 |
| GB | 2094373 | * | 1/2013 | |

*Primary Examiner* — Frederick L Lagman
(74) *Attorney, Agent, or Firm* — Holland & Hart

(57) ABSTRACT

A trench-shoring sheeting panel includes a rectangular-shaped polyethylene sheet having opposing primary surfaces and four corners, a planar support structure embedded in the polyethylene sheet, a plurality of hand hold apertures formed in the polyethylene sheet, a plurality of corner holes positioned adjacent to the four corners, and a plurality of protrusions positioned on at least one of the primary surfaces.

20 Claims, 11 Drawing Sheets

(56) References Cited

U.S. PATENT DOCUMENTS

| | | | | |
|---|---|---|---|---|
| 4,804,299 A * | 2/1989 | Forte | ................... | E02D 29/0241 |
| | | | | 405/262 |
| 5,044,833 A * | 9/1991 | Wilfiker | .............. | E02D 29/0241 |
| | | | | 405/262 |
| 5,096,334 A * | 3/1992 | Plank | ...................... | E02D 17/08 |
| | | | | 405/272 |
| 5,277,522 A * | 1/1994 | Pertz | ....................... | E02D 17/08 |
| | | | | 405/272 |
| 5,305,568 A * | 4/1994 | Beckerman | ............... | B32B 3/00 |
| | | | | 428/116 |
| 5,414,883 A * | 5/1995 | Fangrow, Jr. | ............ | A61G 1/01 |
| | | | | 128/870 |
| 5,516,238 A * | 5/1996 | Beury | ..................... | E02D 17/08 |
| | | | | 405/282 |
| 5,568,998 A * | 10/1996 | Egan | ................... | E02D 29/0241 |
| | | | | 403/391 |
| 6,117,519 A * | 9/2000 | Burns | ....................... | B32B 3/12 |
| | | | | 428/116 |
| 6,811,357 B1 * | 11/2004 | Haug | ....................... | A01G 1/08 |
| | | | | 405/285 |
| 7,290,961 B1 * | 11/2007 | Ottman et al. | ........ | E02D 17/083 |
| | | | | 405/272 |
| 7,568,863 B2 * | 8/2009 | DeNardo | ................ | E02D 17/20 |
| | | | | 405/107 |
| 2004/0013901 A1 * | 1/2004 | Irvine | ................ | B29C 47/0019 |
| | | | | 428/689 |
| 2004/0208702 A1 * | 10/2004 | Buchanan | ................ | E02B 3/06 |
| | | | | 405/15 |
| 2009/0103986 A1 * | 4/2009 | Byrne | ..................... | E02D 17/10 |
| | | | | 405/282 |
| 2010/0264390 A1 * | 10/2010 | Cerda | ..................... | E02D 17/08 |
| | | | | 256/24 |
| 2013/0017021 A1 * | 1/2013 | Price | ....................... | E02D 17/08 |
| | | | | 405/282 |

* cited by examiner

SHEETING PANELS AND SHEETING-PANEL SYSTEMS

RELATED APPLICATION

This claims the benefit of U.S. Provisional Application No. 62/043,895, filed 29 Aug. 2014, which is incorporated herein in its entirety by this reference.

TECHNICAL FIELD

The present invention relates to the field of sheeting panels useful for various applications, including in the construction industry. The sheeting panels may be used, for example, as shoring systems for supporting the sides of a trench or hole in the ground and, in particular, sheeting panels for hydraulic shoring techniques. The sheeting panels may also serve other purposes, such as both a shoring system and as a portable roadway system for vehicles (e.g., backhoes, cranes, tractors, etc.).

BACKGROUND

Various shoring techniques have been employed for supporting the sides of a trench or hole in the ground during excavation. One shoring technique, called "aluminum hydraulic shoring," employs hydraulic jacks, aluminum shoring rails, and shoring sheeting panels to support the sides of the trench. After a portion of the trench is excavated, two sheeting panels may be placed substantially parallel to one another on opposite sides of the trench. The shoring rails, typically already connected by the hydraulic jacks, are then placed on the faces of the two sheeting panels. The hydraulic jacks extend perpendicularly from the face of one sheeting panel to the face of the second sheeting panel. After proper placement of the shoring rails and hydraulic jacks, the hydraulic cylinders within the jacks are pressurized. Alternatively, the hydraulic shoring rails may be fastened to the sheeting panels, and then the assembly of rails and panels may be placed in the trench.

In 1989, the Occupational Safety and Health Administration (OSHA) adopted Federal Standard 29 CFR 1926, Subpart-P establishing safety requirements for excavation worksites. In particular, Regulation 1926, Subpart-P, Appendix D includes item (g)(7) identifying the types of shore sheeting that may be used for aluminum hydraulic shoring for trenches. Item (g)(7) states: "Plywood shall be 1.125 inch thick softwood or 0.75 inch thick, 14 ply, arctic white birch (Finland form). Please note that plywood is not intended as a structural member, but only for prevention of local raveling (sloughing of the trench face) between shores."

The OSHA Subpart P Standard also requires (i) manufacturers of shoring equipment to develop their own tabulated data for the aluminum hydraulic shoring equipment they develop, and (ii) users of the equipment to adhere to the data developed for the shoring rails and sheeting panels they are using. To afford themselves broader liability protection, most manufacturers of hydraulic shoring have tried to stay as close as possible to the data developed by OSHA. Other types of sheeting such as steel plate and plywood with performance equivalent to and even less than three-quarter-inch, 14 ply, Artic White Birch (Finland form or "Finn-Form") have been allowed. FinnForm plywood is a relatively difficult standard to meet or exceed so it is used as the calibration standard within the industry.

To date, plywood has primarily been used for shoring sheeting panels. Although plywood performs well as a shoring panel, the material also has a number of drawbacks. In particular, water, mud, and drying cause the plywood panels to gray and eventually delaminate. The handling and installation of plywood panels also breaks the corners of the plywood panels. Thus, the useful life of plywood sheeting panels is approximately one to two years.

Additionally, plywood breaks and punctures relatively easily. If a plywood sheeting panel is punctured or an edge of the panel is broken, the overall area of restraint provided by the panel is reduced. Unrestrained areas of soil and rock may shift and move, creating potential safety hazards.

As noted, plywood sheeting panels can be damaged during handling, which may include dragging the panel. Over time, the panel becomes bent in the face plane, and breaking and splintering occurs on the face of the panel. As the deterioration progresses, the coverage and effectiveness of the sheeting becomes less than intended. Furthermore, splintering on the edges and face of the plywood present a safety hazard to workers handling the shores (e.g., the assembly of shore rails and sheeting panels). Even with gloves on, large plywood splinters can penetrate the hands and other parts of the body. Workers inside the trench that are not handling the shores can still brush up against the shore, receiving puncture wounds. Working at the trench level exposes the upper body and head to the surrounding shoring sheeting.

To combat these issues, metal edge protectors may be installed on plywood sheeting panels, and the shores may be cleaned and refurbished after each use. The cost and time associated with replacing the plywood panels, installing metal edge protectors, and cleaning the shores can be excessive.

It is also sometimes necessary in the construction industry, or in other industries, to drive vehicles over turf, soft soil, swampy conditions, or other areas whereby a vehicle may damage the turf or otherwise sink into soil and become stuck. This may particularly pose a problem for large vehicles, such as cranes.

A solution that has been employed when driving a vehicle in a grassy or muddy area has been to use wooden boards such as plywood to provide a temporary road way. The problems with using plywood sheets as a temporary roadway for these conditions are similar to those described (above) regarding the use of plywood in shoring operations. For instance, the plywood splits and splinters creating difficulties for workers.

Plastic or fiberglass sheeting has also been employed to create a temporary roadway when driving a vehicle in a grassy or muddy area. However, the roadway sheeting that has been developed to date has limitations, particularly in applications for heavy equipment (e.g., equipment relating to oil and gas drilling), because sheeting constructed using traditional material configurations may be heavy and costly to manufacture.

Therefore, a need exists for an improved sheeting panel that meets or exceeds the OSHA regulations for aluminum hydraulic shoring for trenches. More particularly, there exists a need for a sheeting panel that reduces the long-term cost of maintaining and installing shoring systems and is durable, easy to handle and maintain, and safe for both shore installers and workers inside the trench. A further need exists for improved sheeting that may be employed to create a temporary roadway.

SUMMARY

One aspect of the present disclosure relates to a trench-shoring sheeting panel that includes a rectangular sheet comprising opposing front and rear primary surfaces, first and second ends, first and second side edges, and a polymer filler material. The sheeting panel also includes a structural member embedded in the polymer filler material between the front and rear primary surfaces.

The structural member may include at least one grid structure. The at least one grid structure may include a polymer material. The at least one grid structure may include polyester. The at least one grid structure may include a continuous structure that extends from the first end to the second end and from the first side edge to the second side edge. The structural member may include first and second grid structures spaced apart from each other between the front and rear primary surfaces. The polymer filler material may include polyethylene. The structural member may include at least one sheet of fiberglass material. The structural member may include at least two sheets of fiberglass material that are spaced apart from each other between the front and rear primary surfaces. The at least one sheet of fiberglass material may include a plurality of perforations. The sheeting panel may also include a plurality of protrusions extending from at least one of the front and rear primary surfaces. The sheeting panel may include at least one aperture extending from the front primary surface to the rear primary surface. The at least one aperture may include a first plurality of apertures each sized to receive a user's hand, and a second plurality of apertures that are smaller in size than the first plurality of apertures.

Another aspect of the present disclosure relates to a trench-shoring sheeting panel that includes a rectangular-shaped polyethylene sheet having opposing primary surfaces and four corners, a planar support structure embedded in the polyethylene sheet, a plurality of hand hold apertures formed in the polyethylene sheet, a plurality of corner holes positioned adjacent to the four corners, and a plurality of protrusions positioned on at least one of the primary surfaces.

The planar support structure may include a plurality of perforations. The planar support structure may include at least one of polyester and fiberglass. The planar support structure may extend along substantially an entire length and across substantially an entire width of the polyethylene sheet.

A further aspect of the present disclosure relates to a method of forming a trench-shoring sheeting panel. The method includes providing at least one support structure and a volume of polymer material, forming the polymer material into a rectangular sheet with the at least one support structure embedded therein, and forming a plurality of holes in the rectangular sheet.

The method may also include forming a plurality of protrusion on at least one primary surface of the rectangular sheet. The polymer material may include polyethylene and the at least one support structure may include one of polyester and fiberglass.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
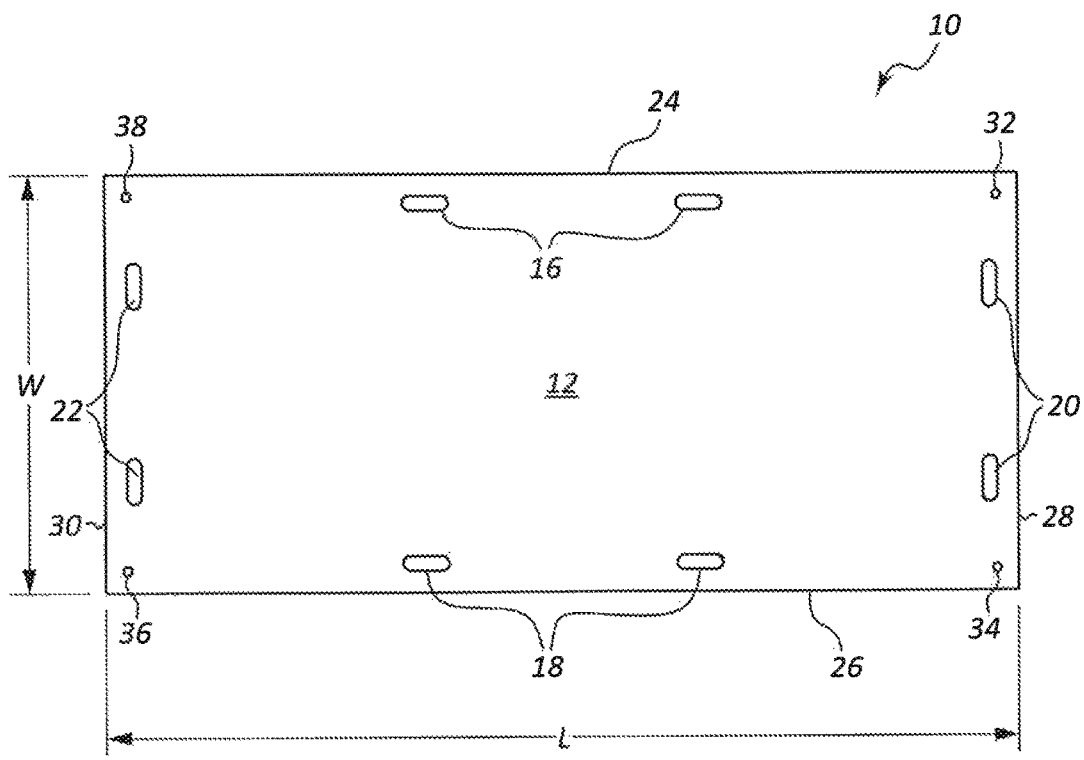
FIG. 1 is a front view of a sheeting panel in accordance with the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION

As will be described in greater detail below, the present disclosure relates generally to sheeting panels. The present disclosure particularly relates to sheeting panels that comprise polymer materials.

One aspect of the present disclosure relates to sheeting panels that comprise primarily polyethylene. The sheeting panel may include a structural insert such as a grid or sheet of material. The structural insert may comprise a different polymer such as polyester, or a fiberglass material.

Figure 2:
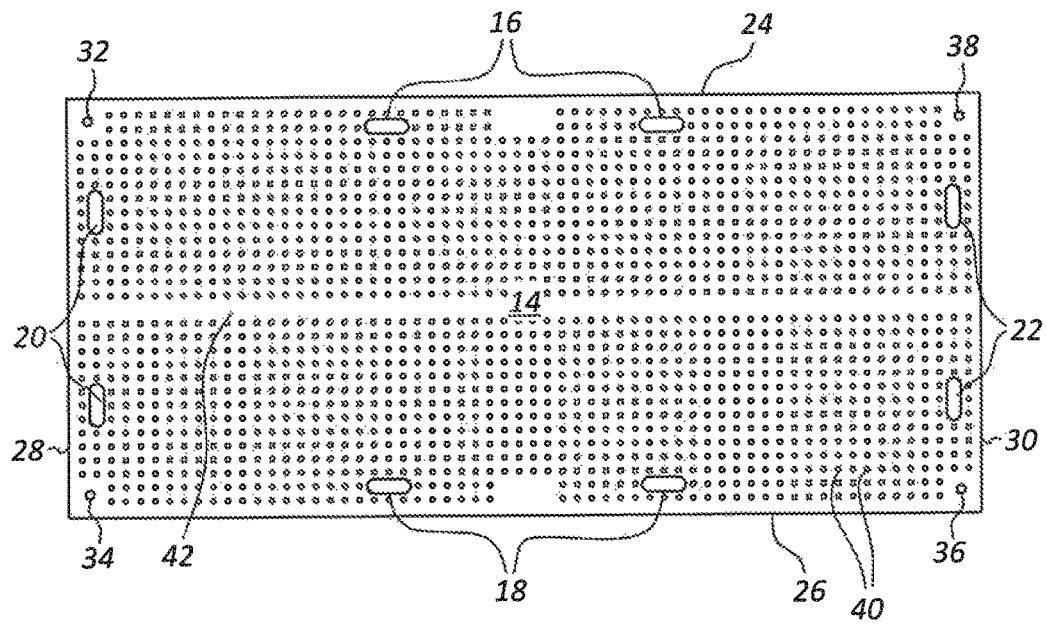
FIG. 2 is a rear view of the sheeting panel of FIG. 1.

As depicted in FIGS. 1 and 2, an example sheeting panel 10 has a substantially rectangular shape. The term "substantially rectangular" is meant to succinctly describe a simple geometric shape approximating a rectangle. In this regard, the sheeting panel 10 includes a front surface 12 (see FIG. 1) and a rear surface 14 (see FIG. 2). The terms "front" and "rear" are simply meant to distinguish the two primary opposing surfaces of the sheeting panel 10.

In exemplary embodiments, the sheeting panel 10 has as width W of about 20 to about 80 inches, more particularly about 45 inches to about 55 inches, and in one embodiment about 48 inches. The sheeting panel 10 may have a length L of about 80 inches to about 120 inches, more particularly about 90 inches to about 100 inches, and in one embodiment about 96 inches. The sheeting panel 10 may a thickness T of about ¼ inch to about 2 inches, more particularly about ½ inch to about 1 inch, and in one embodiment about ⅝ inch.

The sheeting panel 10 may include a plurality of hand holes (also referred to as hand hold apertures), such as the pair of hand holes 16, 18, 20, 22 shown in FIGS. 1-2. The pair of hand holes 16, 18, 20, 22 may facilitate improved handling of the sheeting panel 10. The pair of hand holes 16, 18 are positioned adjacent to side edges 24, 26 of the sheeting panel 10. The pairs of hand holes 20, 22 are positioned adjacent to end edges 28, 30 of the sheeting panel 10. The hand holes 16, 18, 20, 22 may be formed into the sheeting panel 10 during manufacturing, such as using molding. Alternatively, the hand holes 16, 18, 20, 22 may be cut out or otherwise machined into the sheeting panel 10. For a given pair of hand holes 16, 18, 20, 22, the hand holes are typically spaced apart along respective edges 24, 26, 28, 30 of the sheeting panel 10.

The sheeting panel 10 is shown includes pairs of hand holes 16, 18, along respective edges 24, 26, 28, A. In other embodiments, the sheeting panel 10 may include individual hand holes located at any desired location on the sheeting panel 10. For example, if the width W of the sheeting panel 10 is relatively small, a single hand hole positioned along one of the end edges 28, 30 may be sufficient to facilitate proper handling of the sheeting panel 10.

The sheeting panel 10 may also include a plurality of corner holes, such as the four corner holes 32, 34, 36, 38 shown in FIGS. 1 and 2. As depicted in FIG. 1, corner hole 32 is offset internally from the edges 24, 28. Corner holes 34, 36, 38 are similarly offset internally from edges 26, 28, 30. Ropes, cables, fasteners or other connecting features may be passed through the corner holes 32, 34, 36, 38 to facilitate installation or removal of the sheeting panel 10 at a work location, storage location or on a transport vehicle. The corner holes 32, 34, 36, 38 may be formed in the sheeting panel 10 during manufacturing, such as being molded into the sheeting panel 10. Alternatively, the corner holes 32, 34, 36, 38 may be drilled, cut out of, or otherwise machined into the sheeting panel 10.

As depicted in FIG. 2, at least one side of the sheeting panel 10 typically includes a plurality of surface features 40. The surface features 40 may be in the form of protrusions (e.g., dimples) or recesses. The surface features 40 are shown in FIG. 2 protruding outward from only the rear surface 14 of the sheeting panel 10. FIGS. 3-6 show another embodiment of a sheeting panel 100 in which the surface features 40 are included on both of the surfaces 12, 14 of the sheeting panel 10. The surface features 40 may increase a frictional force (i.e., provide extra traction) between a working surface (e.g., a shore rail or a vertical face of a trench) and the sheeting panel 10, thereby reducing the risk of sliding or slipping.

The plurality of surface features 40 may be located on a majority of the surface area of surfaces 12, 14 of the sheeting panel 10. In one embodiment, about 60% to about 90% of the surface area of one or both of the surfaces 12, 14. In some embodiments, a strip of area 42 extending centrally along the length L of one or both of the surfaces 12, 14 is free of surface features 40 (i.e., no surface features 40 are located on the rear surface 14 in this area), as shown in FIG. 2.

As previously noted, the sheeting panel 10 may comprise a polymer material such as polyethylene. Polymer material such as polyethylene may provide advantages in terms of both convenience and structural performance as compared to typical plywood sheeting panels (e.g., the FinnForm panel discussed above). For example, a polymer sheeting panel may be manufactured in a variety of colors (e.g., black or white), shapes, and sizes, and be easily cleaned by spray washing. A variety of manufacturing methods, such as injection molding, blow molding, thermos molding, and compression molding, may be used to create a polymer sheeting panel. Furthermore, the polyethylene sheeting panels may be cut and drilled with the same tools and machining process that are used for plywood sheeting panels.

From a structural standpoint, a polymer sheeting panel provide additional benefits. For example, a polymer sheeting panel typically does not splinter or delaminate. Furthermore, a polymer sheeting panel typically deflect rather than breaking under excessive loads. A polymer sheeting panel of comparable thickness and length/width dimensions typically weights less than a plywood sheeting panel. IN one example, a polyethylene sheeting panel with dimensions of 48 inches wide, 96 inches long, and ⅝ inch thick weighs approximately 100 lbs., which is at least 10% to 20% less weight than a comparably sized plywood sheeting panel. Polymer sheeting panels may also meet or exceed the structural properties of three-quarter inch plywood sheeting panels (e.g., FinnForm).

TABLE I shown below is a comparison of physical and structural properties of polyethylene sheeting panels to the plywood panels allowed in OSHA Regulation 1926, Subpart-P, Appendix D, item (g)(7).

TABLE I

| Panel | Thickness (inch) | Ultimate Bending Strength (psi) | Unit Weight (psf) | Maximum Bending Moment (in-lb) | Modulus of Elasticity (ksi) | Moment of Inertia (in$^4$) | Section Modulus ks (in$^4$) |
| --- | --- | --- | --- | --- | --- | --- | --- |
| Polyethylene | 0.5 | 6700 | 2.63 | 3350 | 304 | 0.125 | 0.500 |
| FinnForm | 0.75 | 6244 | 2.71 | 3465 | 1830 | 0.183 | 0.555 |
| Softwood | 1.125 | 3300 | 3.30 | 2455 | 1800 | 0.27 | 0.744 |

Despite the fact that OSHA Regulation 1926 does not consider sheeting to be a structural member, from an engineering standpoint, a structural comparison is an appropriate way to compare the panels. In a structural sense, 1.125 inch thick softwood is inferior to both polyethylene sheeting panels and FinnForm. Maximum bending moment is a particularly notable value in TABLE I because, if a panel were to fail by trench wall collapse, bending would be the failure mode of the sheeting. Although the FinnForm panel has a higher maximum bending moment than the polyethylene sheeting panel, the overall analysis indicates that the polyethylene sheeting panel is technically equivalent to the FinnForm panel.

The modulus of elasticity is much lower for polyethylene sheeting panels. Although this indicates that the panel will deflect more when loaded, for the purpose of preventing local raveling, it is considered an advantage because it allows the shore and sheeting to conform to the trench wall without breaking the sheeting. The higher modulus of elasticity associated with plywood and FinnForm is an indication that it is more brittle and will break, delaminate, or puncture more easily.

Additional mechanical tests were performed on polyethylene sheeting panels in accordance with some embodiments of the present invention. The results of those tests can be found in Appendix 2.

Figure 3:
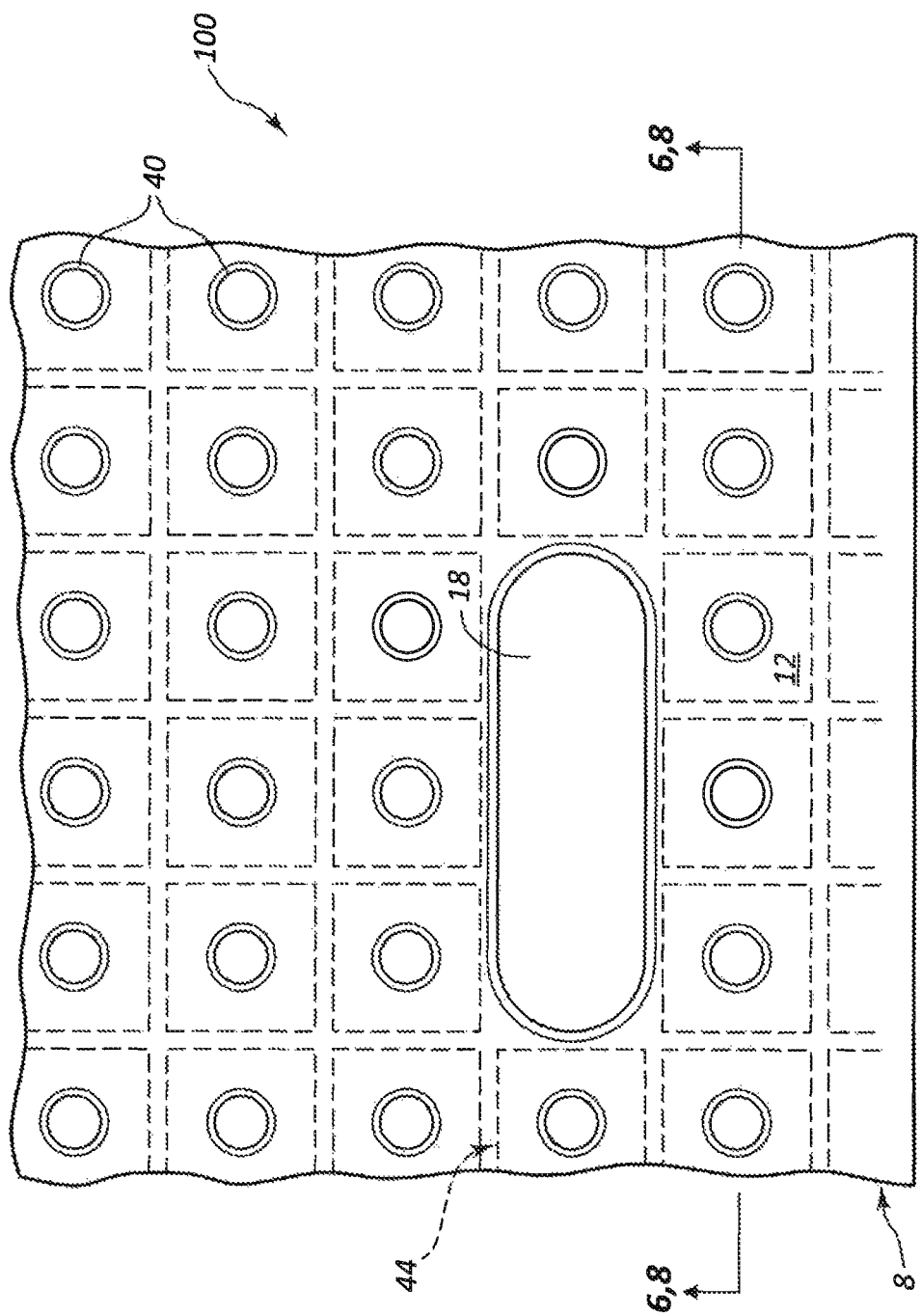
FIG. 3 is front view of a portion of another example sheeting panel in accordance with the present disclosure.

FIGS. 3-6 show an alternative sheeting panel 100. FIG. 3 is perspective view of a portion of the sheeting panel 100 that shows a grid-shaped structural member 44 embedded in the polymer sheet 8 of the sheeting panel 100. As a whole, a full sheeting panel of the kind depicted in FIGS. 3-6 may incorporate the features as set forth with reference to FIGS. 1-2 and may additionally include surface features 40 on both surfaces 12, 14. The surface features 40 and other features such as any of hand holes 16, 18, 20, 22 or corner holes 32, 34, 36, 38 may be omitted from a sheeting panel 100.

Figure 4:
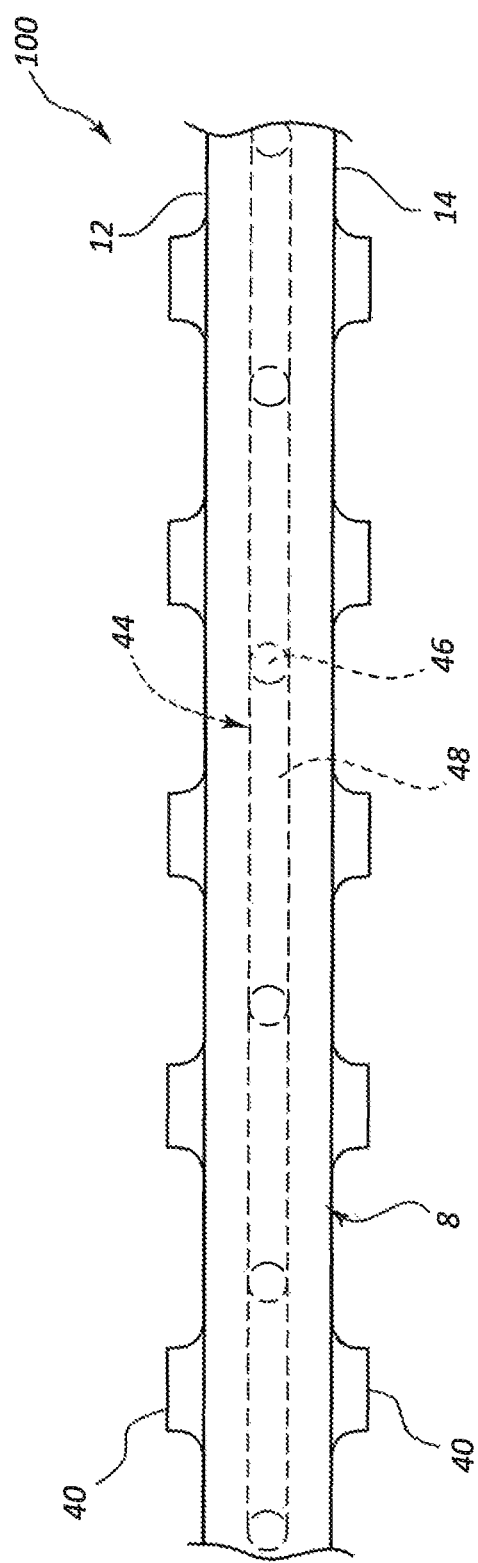
FIG. 4 is a side view of the sheeting panel of FIG. 3.
Figure 5:
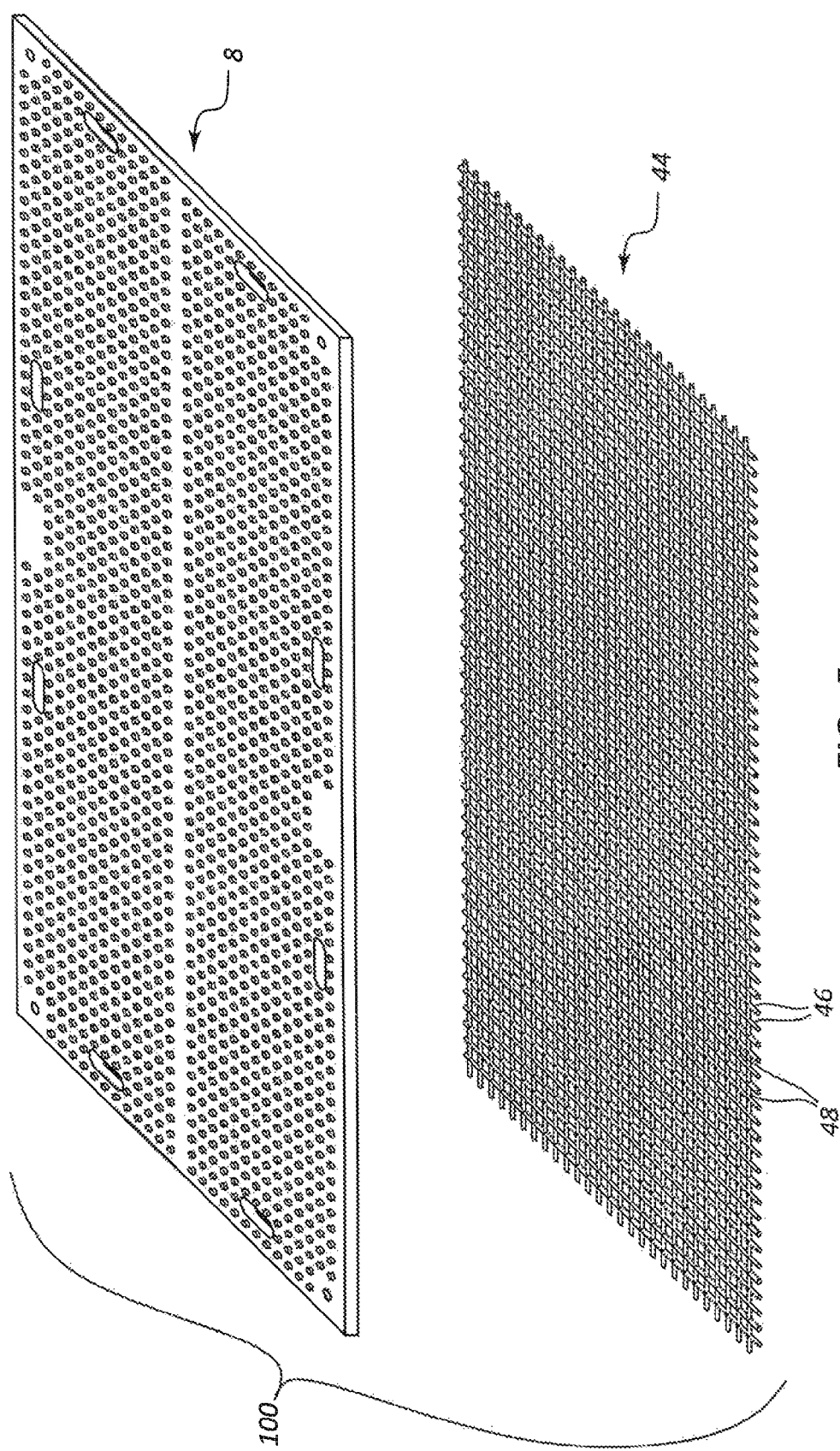
FIG. 5 is an exploded perspective view of the sheeting panel of FIG. 3.
Figure 6:
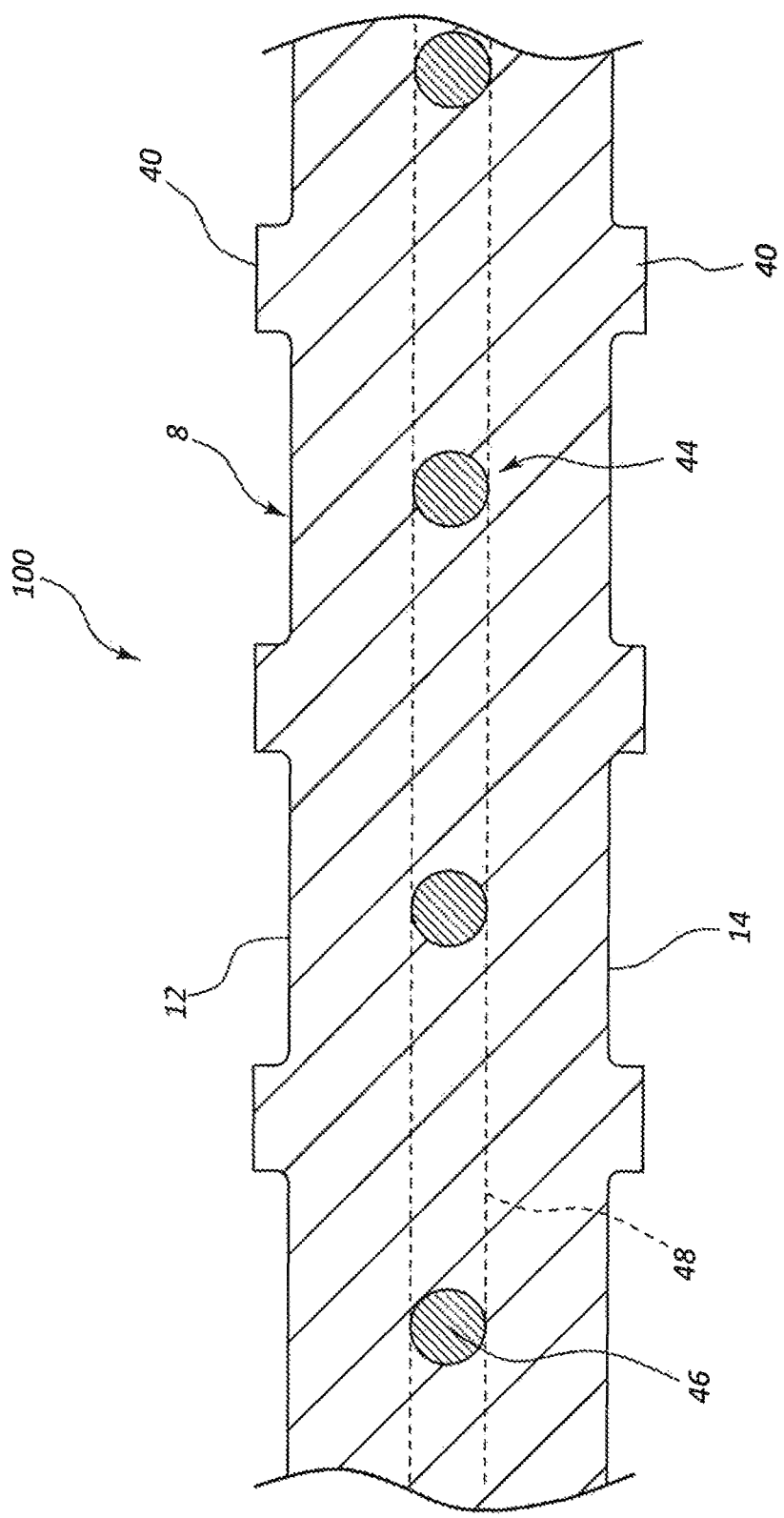
FIG. 6 is a cross-sectional view of the sheeting panel of FIG. 3 taken along cross-section indicators 6-6.
Figure 7:
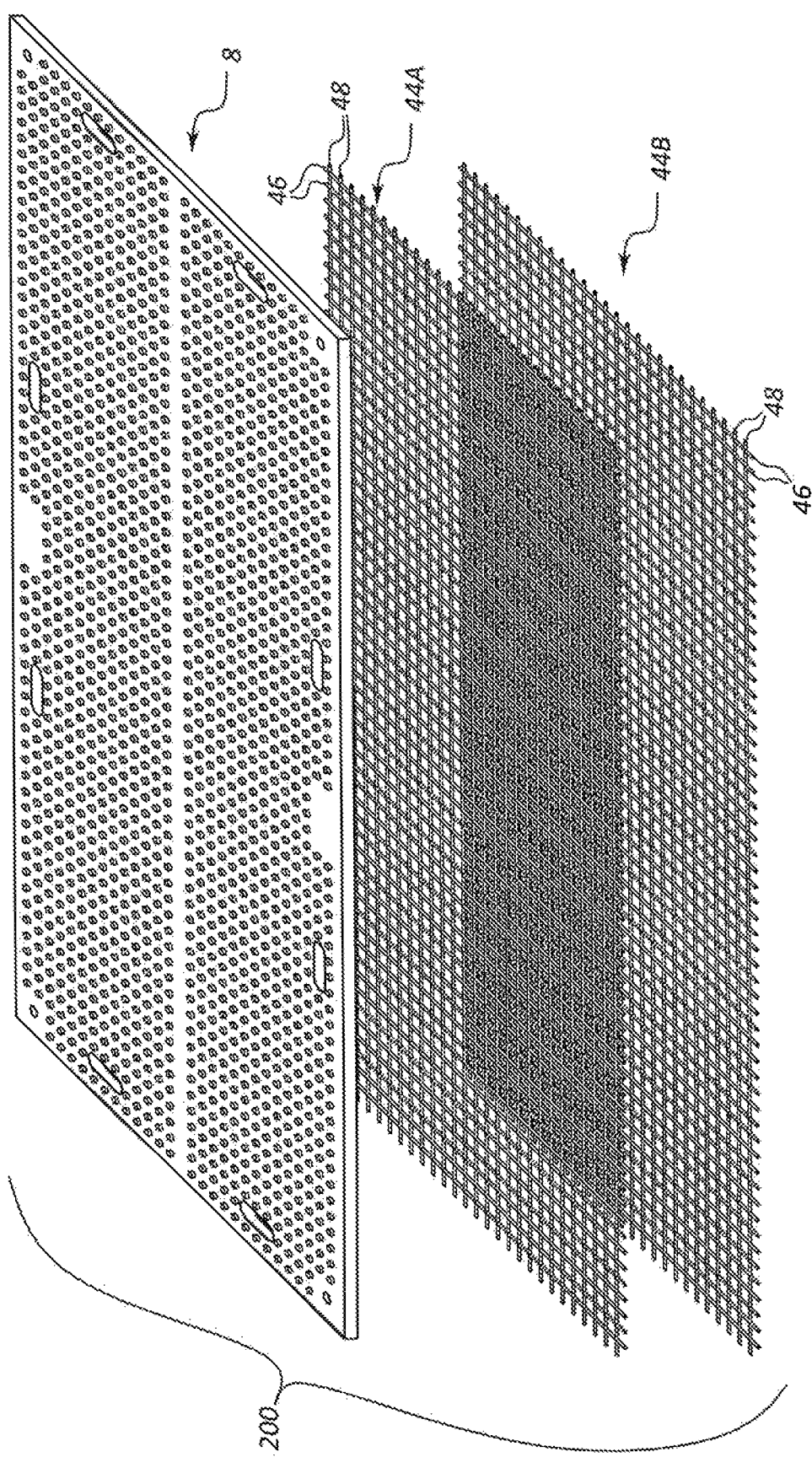
FIG. 7 is an exploded perspective view of an alternative embodiment of the sheeting panel of FIG. 3.
Figure 8:
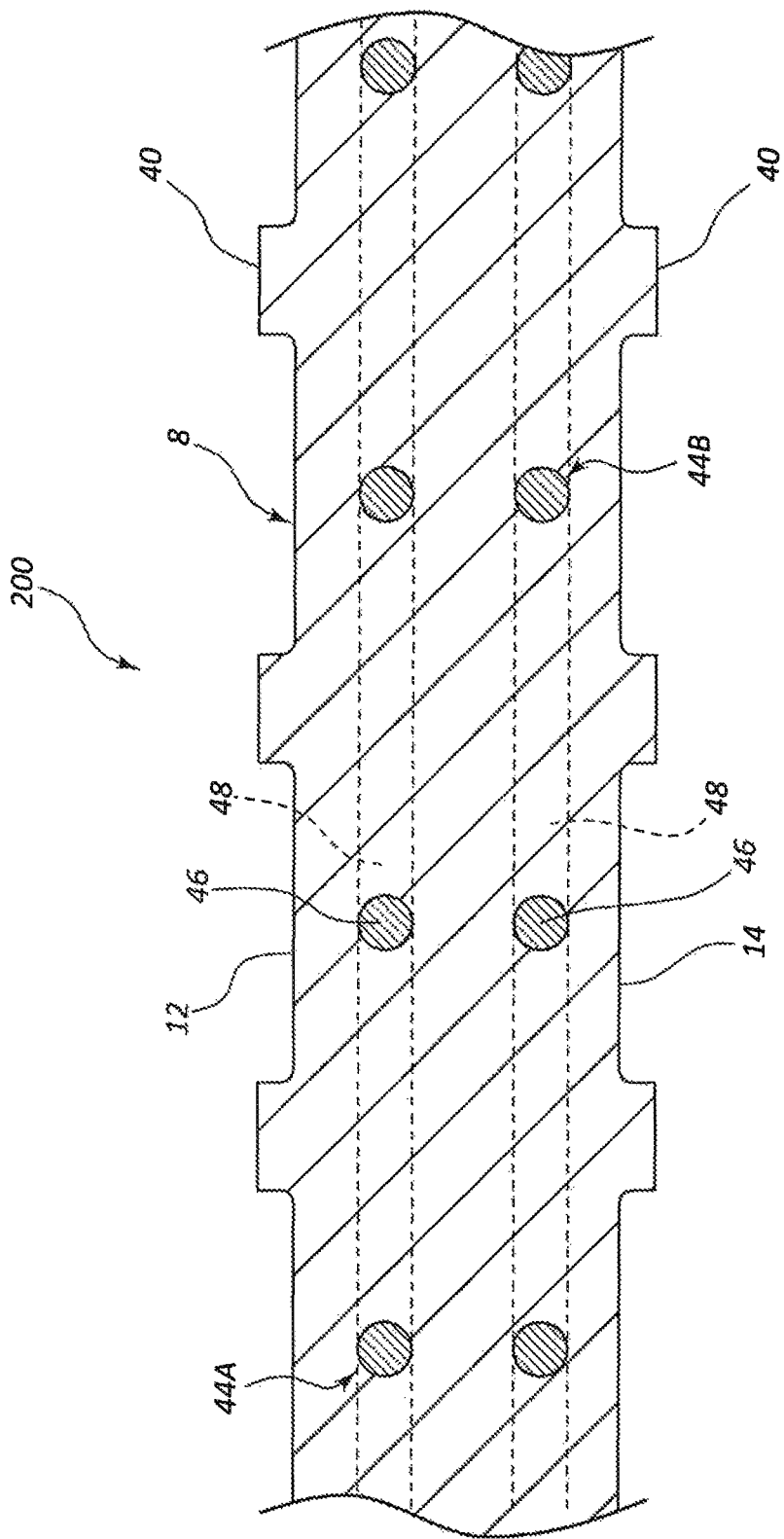
FIG. 8 is a cross-sectional view of the sheeting panel of FIG. 3 taken along cross-section indicators 8-8.
Figure 9:
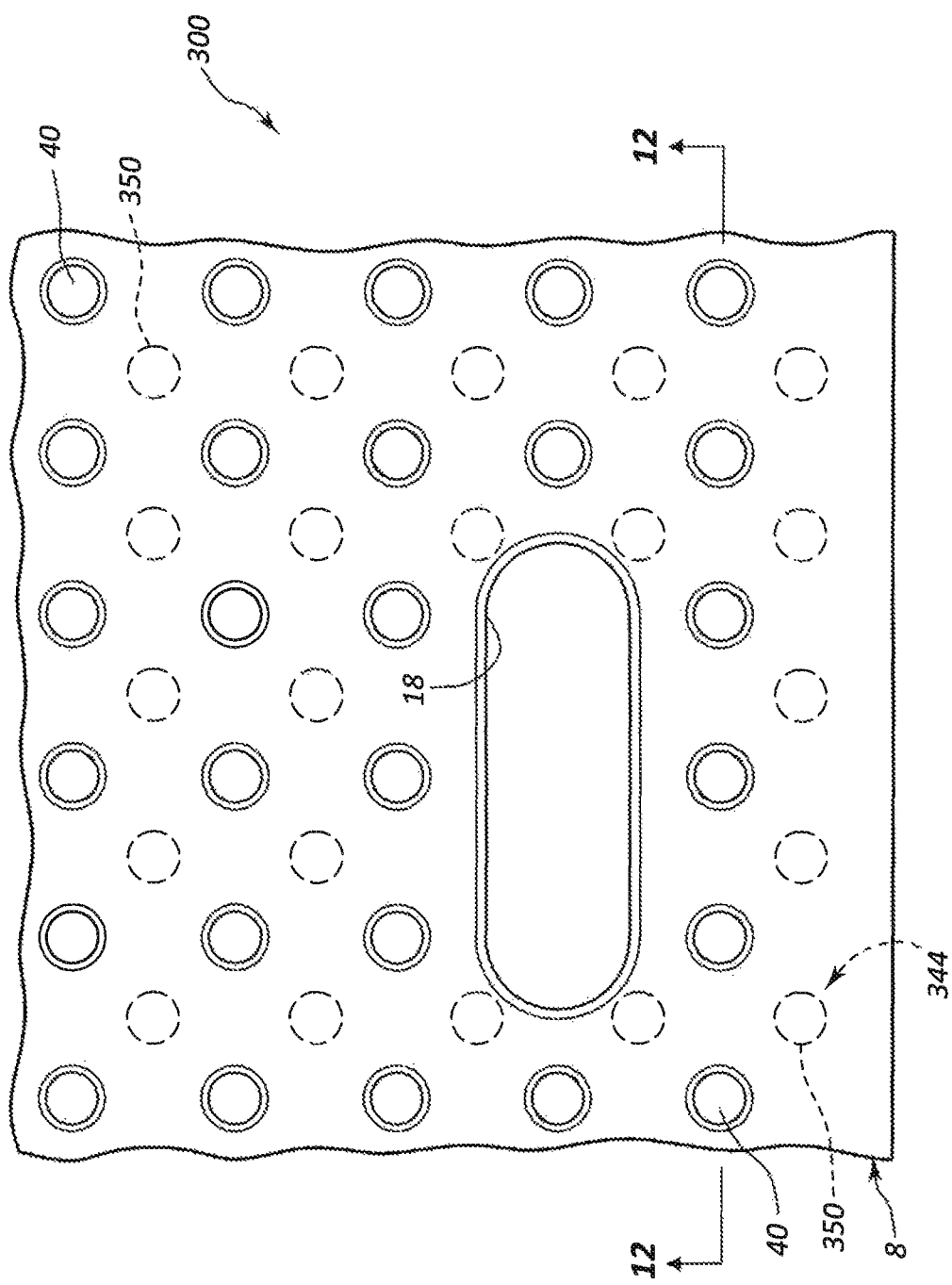
FIG. 9 is a front view of a portion of another example sheeting panel in accordance with the present disclosure.
Figure 10:
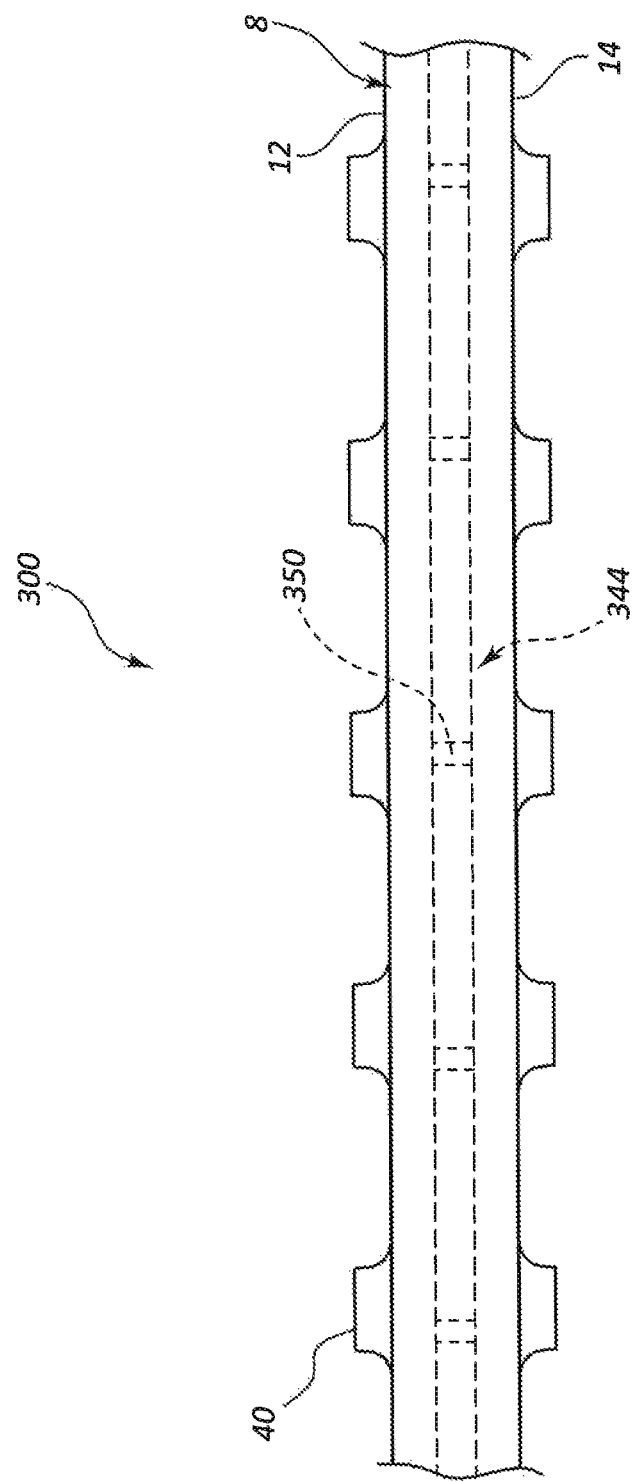
FIG. 10 is a side view of the sheeting panel of FIG. 9.
Figure 11:
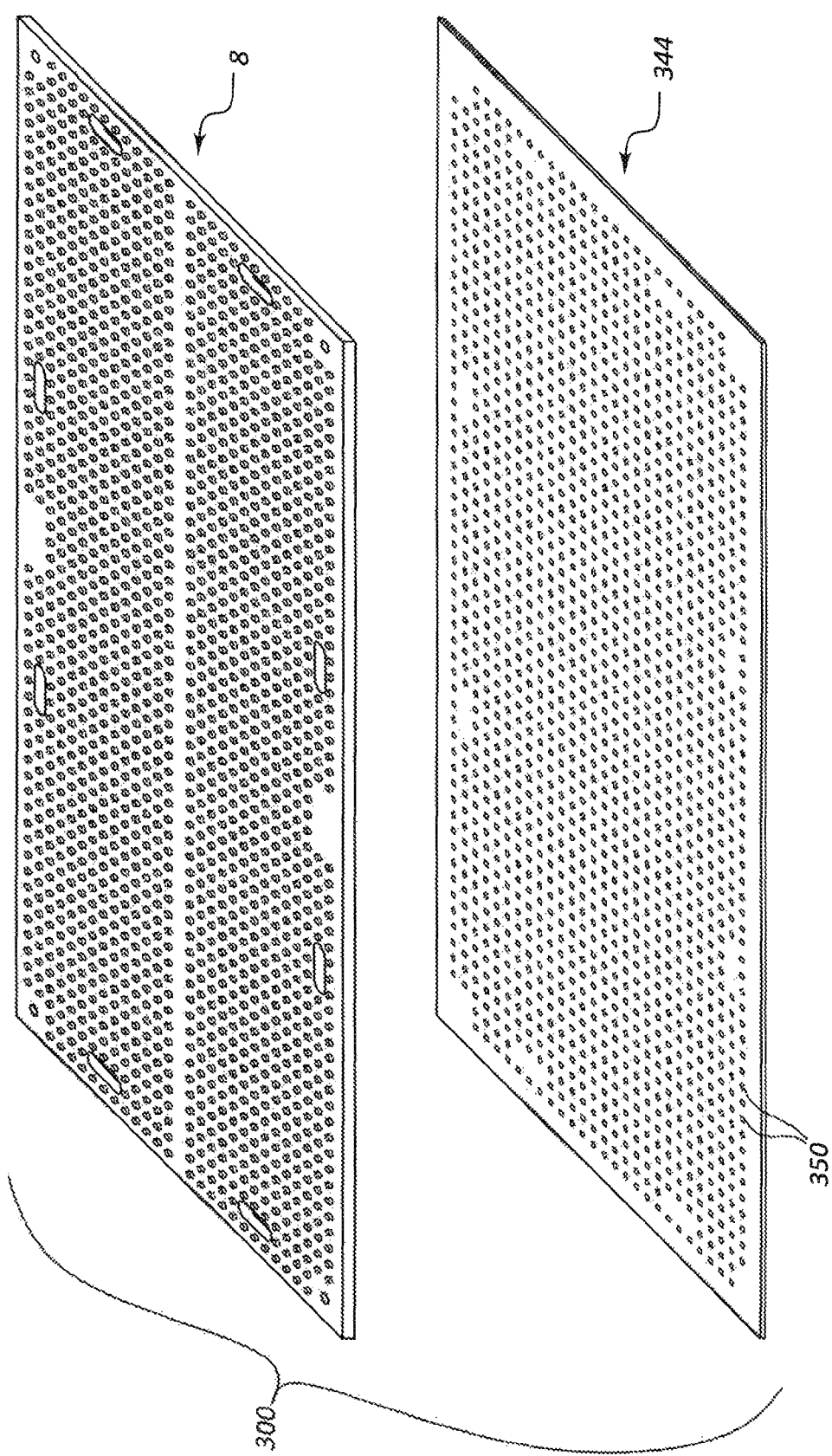
FIG. 11 is an exploded perspective view of the sheeting panel of FIG. 9.
Figure 12:
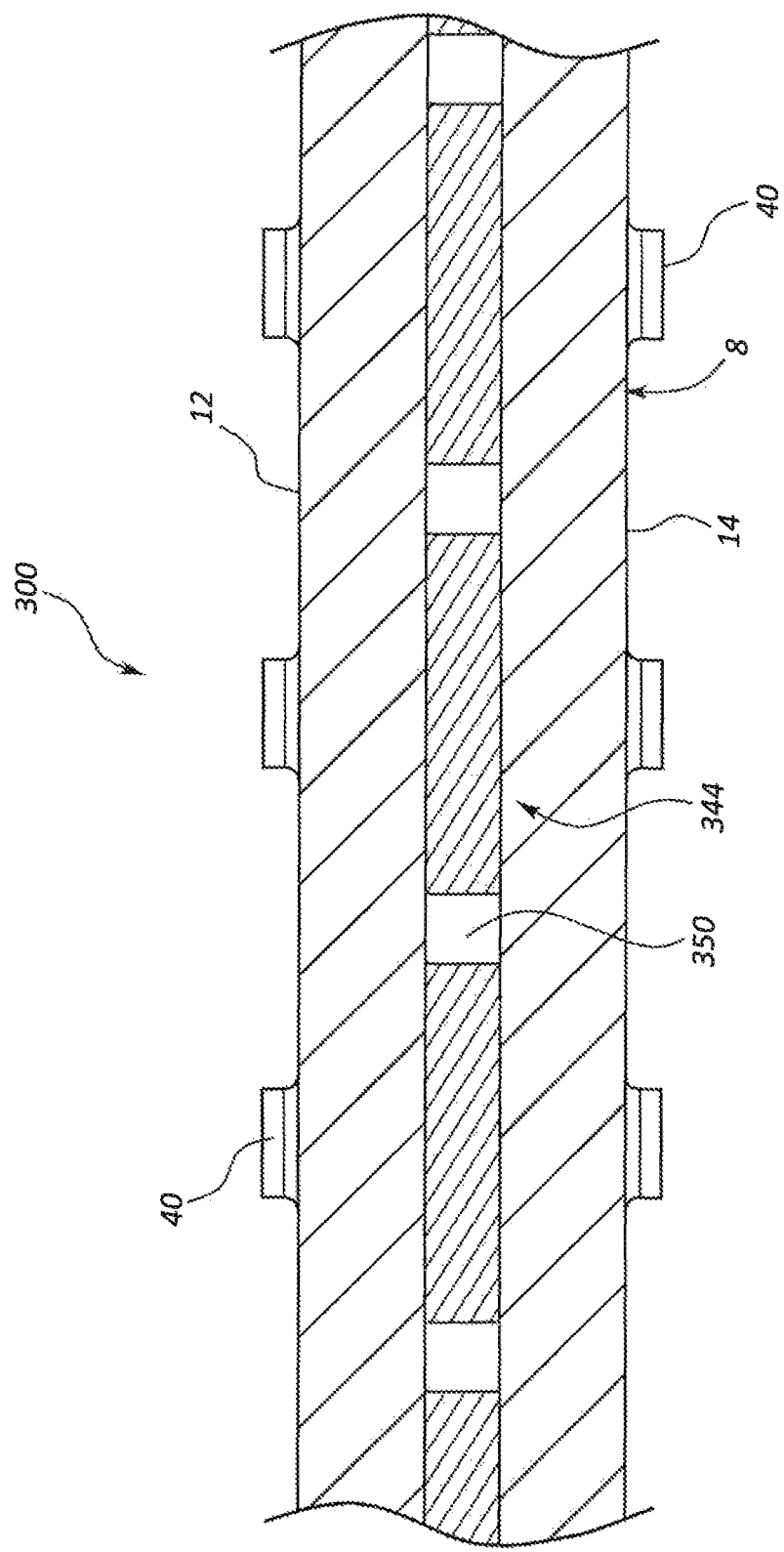
FIG. 12 is a cross-sectional view of the sheeting panel of FIG. 9 taken along cross-section indicators 12-12.

FIG. 4 depicts a side view of the portion of the sheeting panel 100 shown in FIG. 3 showing the structural member 44 in broken lines. FIG. 5 is an exploded perspective view of the sheeting panel 100 with the structural member 44 have a grid-shaped construction, and the structural member 44 being a separate structure from the polymer sheet 8. FIGS. 7-8 show another example sheeting panel 200 having two embedded structural members 44A, 44B. The structural members 44A, 44B may be arranged stacked on top of each other and spaced apart from each other between the surfaces 12, 14 of the polymer sheet 8. Further embodiments may include more than two structural members 44. The structural members 44 may have any desired arrangement within the polymer sheet 8.

The structural members 44 may have any desired structural shape and size. For example, the structural member 44 shown in FIGS. 3-6 has a grid-shaped structure that includes a plurality of width members and a plurality of length members. The width and length members 46, 48 may be integrally formed as a single piece structure. In other embodiments, the width and length members 46, 48 are separately formed and then connected to each other in a separate assembly step. The width and length members 46, 48 may have a circular cross-sectional shape as shown in at least FIGS. 5 and 6, or may have other cross-sectional shapes such as rectangular. In other embodiments, the structural member 44 may have a sheet construction with a plurality of apertures formed therein to provide a perforated construction.

The structural member 44 may have openings (e.g., the spaces between the width and length members 46, 48 or the apertures in a perforated structural member) that allow the polymer materials of the polymer sheet 8 to flow into the openings during forming of the sheeting panel 100. The structural member 44 may be integrated into and/or permanently connected with the polymer sheet 8 such that when the sheeting panel 100 is subjected to stress, the structural member 44 limits bending, torqueing, and other deformations of the sheeting panel 100. Typically, the sheeting panel 100 cannot break or otherwise fail under load unless the structural member 44 also breaks or otherwise fails. In the sheeting panel 200, which includes two structural members 44A, 44B, the structural members 44A, 44B redistribute load within the sheeting panel 200 to provide increased stiffness, resistance to deformation, and greater strength properties under load.

FIGS. 9-12 show another example sheeting panel 300 that includes a different type of structural member 344. The sheeting panel 300 may incorporate the polymer sheet features as set forth previously with reference to FIGS. 3-6, such as hand holes 16, 18, 20, 22, corner holes 32, 34, 36, 38, and surface features 40, although any of these features may be omitted.

As shown, the sheeting panel 300 includes a structural member 344 comprising fiberglass material and a plurality of holes or perforations 350. The structural member 344 may be positioned within the polymer sheet 8 between surfaces 12, 14. Thus, the sheeting panel 300 may be a composite structure of polymer sheet 8 and fiberglass structural member 344. In embodiments in which the polymer sheet 8 comprises polyethylene, the sheeting panel 300 may be a composite polyethylene and fiberglass structure.

In use, the sheeting panel 300 may at least some of the same properties and function in a similar manner as sheeting panels 10, 100, 200 described above. For example, the fiberglass structural member 344 may provide increased rigidity, strength, and resistance to failure. Although a single fiberglass structural member 344 is included in sheeting panel 300, other configurations and material choices may be utilized in other embodiments. For example, a sheeting panel may include two or more fiberglass structural members 344 positioned at any location within the polymer sheet 8, such as being stacked within the thickness of the polymer sheet 8 and spaced part from each other and from the surfaces 12, 14.

In still further embodiments, the structural members 44, 344 may comprise other materials such as metal materials, composite materials such as carbon fiber laminate materials, and the like. A single sheeting panel may include a plurality of structural members that each comprises a different material. In other embodiments, a single structural member may include a plurality of different materials.

Example

The use of sheeting panels in hydraulic shoring applications is dependent in large part on depth of excavation and soil type. In general, sheeting panels are required in excavations over 10 feet deep in OSHA type B and C soils. The sheeting may be attached to the shoring or set inside the excavation before the shore (i.e., the shore rails and hydraulic jack) is set and pressurized. Generally, on the west coast and south coast, sheeting panels are attached to the shore, and, on the east coast, it sheeting panels are set independently from the shore.

Shoring panels become damaged on the corners by rigging, dragging on the surface during installation, and removal. Plywood also becomes bent and broken due to raveled and uneven trench walls. Plywood is often cut to fit around pipes and other obstructions. Weather and ground water table conditions also have an effect on the quantity of plywood used and the life expectancy of the sheeting panels. Wet weather conditions in coastal regions typically require more shoring sheeting than the arid weather conditions in central and western states. The purchase and installation of shoring sheeting panels is done at the local supplier level rather than at the manufacturer's level.

The polymer sheeting panel disclosed herein facilitate a reduction in the cost associated with maintaining and installing shoring equipment. In this regard, the following exemplary cost comparison between polymer sheeting panels and FinnForm sheeting panels demonstrates that the sheeting panels of the present disclosure may facilitate a substantial cost savings.

TABLE II (below) presents cost estimates for the useful life of polymer sheeting panels and FinnForm sheeting panels.

TABLE II

| Panel | Material Cost (per sheet) | Unit Cost (per year) | Total Cost per 100 sheets (over 10 years) |
|---|---|---|---|
| FinnForm | $90 | $72.33 | $72,327 |
| Polyethylene | $180 | $21.57 | $21,572 |

In a major municipality on the west coast, a shoring supplier installs 300 sheets of 4 feet×8 feet (48 in.×96 in.) FinnForm on 150 hydraulic shores every two years. The useful life of the FinnForm sheeting is two years. The typical soils that the sheeting is used in are either coarse sands and gravels or medium stiff sandy clays. Rainfall is heavy in the winter and water tables are high, within 8 feet of the surface.

The useful life of the polymer sheeting panels disclosed herein is assumed to be at least 10 years. This useful life assumption is supported by experience using polymer materials in other harsher construction applications. The cost of polymer sheeting panels is about two times the cost of FinnForm. The cost estimates provided in TABLE II include the cost of purchasing the panels, installing the panels on the shores, removing the panels from the shores, disposing of the dilapidated panels, and maintaining the panels after each use. Labor cost is assumed to be at rates typical of a shoring supplier's general warehouse and yard maintenance workforce.

As shown in TABLE II, the cost of operating and maintaining a trench shoring operation can be significantly reduced by using the polymer sheeting panels of the present disclosure.

U.S. Patent Publication No. 2013/0017021, filed on 4 Sep. 2014 and entitled "Sheeting Panels for Trench-Shoring Systems," and U.S. Provisional Patent Application No. 61/508,154, filed on 15 Jul. 2011 and entitled "Sheeting Panels for Trench Shoring," which are incorporated herein in their entireties by this references.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A trench-shoring sheeting panel, comprising:
    a rectangular sheet comprising:
        opposing front and rear primary surfaces;
        first and second ends;
        first and second side edges;
        four corners;
        a polymer filler material;
        a structural member embedded in the polymer filler material between the front and rear primary surfaces, the structural member comprising a plurality of width members and a plurality of length members, the plurality of width members being perpendicularly oriented relative to the plurality of length members, the plurality of width members and the plurality of length members each having a circular cross-section, the structural member comprising a grid structure having rectangular openings positioned between the width and length members, the structural member comprising a plurality of hand hold apertures, the structural member comprising a plurality of corner holes positioned adjacent to the four corners.

2. The sheeting panel of claim 1, wherein the structural member includes at least one grid structure.

3. The sheeting panel of claim 2, wherein the at least one grid structure includes a polymer material.

4. The sheeting panel of claim 2, wherein the at least one grid structure comprises polyester.

5. The sheeting panel of claim 2, wherein the at least one grid structure comprises a continuous structure that extends from the first end to the second end and from the first side edge to the second side edge.

6. The sheeting panel of claim 1, wherein the structural member includes first and second grid structures spaced apart from each other between the front and rear primary surfaces.

7. The sheeting panel of claim 1, wherein the polymer filler material comprises polyethylene.

8. The sheeting panel of claim 1, wherein the structural member comprises at least one sheet of fiberglass material.

9. The sheeting panel of claim 8, wherein the structural member comprises at least two sheets of fiberglass material that are spaced apart from each other between the front and rear primary surfaces.

10. The sheeting panel of claim 8, wherein the at least one sheet of fiberglass material comprises a plurality of perforations.

11. The sheeting panel of claim 1, further comprising a plurality of protrusions extending from at least one of the front and rear primary surfaces.

12. The sheeting panel of claim 1, further comprising at least one aperture extending from the front primary surface to the rear primary surface.

13. The sheeting panel of claim 12, wherein the at least one aperture includes a first plurality of apertures each sized to receive a user's hand, and a second plurality of apertures that are smaller in size than the first plurality of apertures.

14. A trench-shoring sheeting panel, comprising:
    a rectangular-shaped polyethylene sheet, the polyethylene sheet comprising opposing primary surfaces and four corners;
    a support structure embedded in the polyethylene sheet, the support structure comprising a grid shape, the grid shape comprising a plurality of members, the plurality of members having circular cross-sections;
    a plurality of hand hold apertures formed in the polyethylene sheet;
    a plurality of corner holes positioned adjacent to the four corners;
    a plurality of protrusions positioned on at least one of the primary surfaces.

15. The sheeting panel of claim 14, wherein the support structure includes a plurality of perforations.

16. The sheeting panel of claim 14, wherein the support structure comprises at least one of polyester and fiberglass.

17. The sheeting panel of claim 14, wherein the support structure extends along substantially an entire length and across substantially an entire width of the polyethylene sheet.

18. A method forming a trench-shoring sheeting panel, comprising:
   providing at least one support structure and a volume of polymer material, the at least one support structure having a plurality of width members and a plurality of length members, the plurality of width members and the plurality of length members each comprising a circular cross-section, the at least one support structure comprising a grid structure comprising rectangular openings formed by the plurality of width members and the plurality of length members;
   forming the polymer material into a rectangular sheet with the at least one support structure embedded therein;
   forming a plurality of holes in the rectangular sheet, wherein the plurality of holes comprises a plurality of hand hold apertures.

19. The method of claim 18, further comprising forming a plurality of protrusion on at least one primary surface of the rectangular sheet.

20. The method of claim 18, wherein the polymer material comprises polyethylene and the at least one support structure comprises one of polyester and fiberglass.

* * * * *